United States Patent [19]

Barton et al.

[11] Patent Number: 5,351,116
[45] Date of Patent: Sep. 27, 1994

[54] VELOCIMETERS

[76] Inventors: James S. Barton, 33 Temple Village, Gorebridge, Midlothian EH23 4SQ; William K. D. Borthwick, 46 Dreghorn Loan, Colinton, Edinburgh EH13 ODD; David Harvey, Bennachie, 43 Brackenbrae Road, Bishopbriggs, Glasgow G64 2EX; Julian D. C. Jones, 3 Peggies Knowe, Dolphinton, West Linton Pebblesshire EH46 7AL; Roy McBride, 11/7 Duddingston Mills, Edinburgh EH8 7TU, all of Scotland

[21] Appl. No.: 961,905
[22] PCT Filed: Jul. 8, 1991
[86] PCT No.: PCT/GB91/01114
§ 371 Date: Jan. 6, 1993
§ 102(e) Date: Jan. 6, 1993
[87] PCT Pub. No.: WO92/01230
PCT Pub. Date: Jan. 23, 1992

[30] Foreign Application Priority Data

Jul. 6, 1990 [GB] United Kingdom ................ 9014989

[51] Int. Cl.⁵ .................... G01P 3/36; G01B 9/02
[52] U.S. Cl. ..................... 356/28.5; 356/350
[58] Field of Search ................ 356/28.5, 350

[56] References Cited

U.S. PATENT DOCUMENTS 4,470,696  9/1984  Ballard .
4,571,080  2/1986  Papuchon et al. .
4,885,462 12/1989  Dakin ......................... 250/227
4,902,127  2/1990  Byer et al. ................. 356/28.5
4,906,092  3/1990  O'Meara ..................... 356/28.5

FOREIGN PATENT DOCUMENTS 092369  4/1983  European Pat. Off. .
0079268 5/1983  European Pat. Off. .
2936302  4/1981  Fed. Rep. of Germany .

OTHER PUBLICATIONS

Optics and Laser Technology, vol. 18, No. 5, Oct. 1986, Butterworth & Co. (Publishers) Ltd., (London, GB) D. A. Jackson et al.: "Extrinsic fibre–optic sensors for remote measurement: part one", pp. 243–252, see p. 243, line 1–p. 244, col. 1, line 37; FIG. 5 (cited in the application).

Optics and Laser Technology, vol. 1, No. 6, Dec. 1986, Butterworth & Co. (Publishers) Ltd., (London, GB) D. A. Jackson et al.: "Extrinsic Fibre–optic sensors for remote measurement: part two", pp. 299–307, see abstract, p. 229; FIG. 2–6 (cited in the application).

Primary Examiner—Stephen C. Buczinski
Attorney, Agent, or Firm—Cushman, Darby & Cushman

[57] ABSTRACT

A differential laser Doppler velocimeter is based on the use of a modified fibre optic Sagnac Interferometer 1,2. The interferometer phase is dependent not on the target displacement, but on its velocity. The output intensity of the interferometer may be modulated by control means PC which controls loop birefringence introducing a phase bias and polarization offset between counter-propagating beams.

10 Claims, 3 Drawing Sheets

Scale 5mV/div., 2μs/div

VELOCIMETERS

FIELD OF THE INVENTION

This invention relates to velocimeters and, in particular, to differential laser Doppler velocimeters based on the use of a modified fibre optic Sagnac interferometer. A feature of the invention is that the interferometer phase is dependent not on the target displacement, but on its velocity.

BACKGROUND OF THE RELATED ART

Unlike interferometers used to measure a Doppler frequency shift directly, the practical use of the Sagnac is not restricted to very high velocities. It finds particular advantage in the measurement of high frequency oscillatory velocities, where the direct response to velocity effectively discriminates against unwanted low frequency components. To optimize the sensitivity of the interferometer, we have introduced a $\pi/2$ phase bias between the two beams, using a passive technique based on control of the birefringence of the fibre loop.

Fibre optic techniques in laser velocimetry are known (Jackson, D. A., Jones, J. D. C. 1986 Fibre Optic Sensors. Optica Acta 33, 1469, Jackson, D. A., Jones, J. D. C. 1986 Extrinsic fibre optic sensors for remote measurement: parts one and two. Opt. and Laser Tech. 18, 243, 299). Many commercial instruments are now available which use fibres to form flexible waveguides between a source/detector module and a remote probe. It is thus appropriate to consider further applications of fibre optics in which their properties are exploited to facilitate optical signal processing of the Doppler signal. In particular, the use of fibres and fibre components allows the implementation of interferometer configurations which are impractical using conventional optics.

SUMMARY OF THE INVENTION

In the present work, we have considered interferometer arrangements in which the detected optical phase is a function of target velocity, rather than the more usual situation in which an optical intensity is amplitude modulated with a frequency proportional to target velocity. He have thus sought to transfer the signal processing step of frequency discrimination from the electronic to the optical domain.

Direct measurement of velocity is of particular value in measurements on oscillatory targets or flows. For example, consider the use of a conventional reference beam laser velocimeter (such as one having the configuration of a Michelson interferometer, in which the target is effectively one mirror of the interferometer) used to measure out of plane vibration. The phase of the interferometer is dependent on the displacement of the target surface, and hence for a given velocity the amplitude of the phase modulation declines as the oscillation frequency is increased. Hence the measurement of high frequency oscillations is difficult, and it is generally necessary to use active phase modulation techniques to recover the high frequency signal in the presence of unwanted larger amplitude low frequency ambient vibrations.

According to the present invention there is provided a velocimeter comprising an interferometer including a loop of fibre optic radiation guide, means for launching optical signals in opposite directions around said loop, probe means located within said loop and adapted to launch said optical signals from said radiation guide towards a moveable target, to receive said signals after reflection from said target and to re-direct said signals into said radiation guide.

BRIEF DESCRIPTION OF THE DRAWINGS

Embodiments of the invention will now be described by way of example with reference to the accompanying drawings in which.

DESCRIPTION OF PREFERRED EMBODIMENTS

Figure 2:
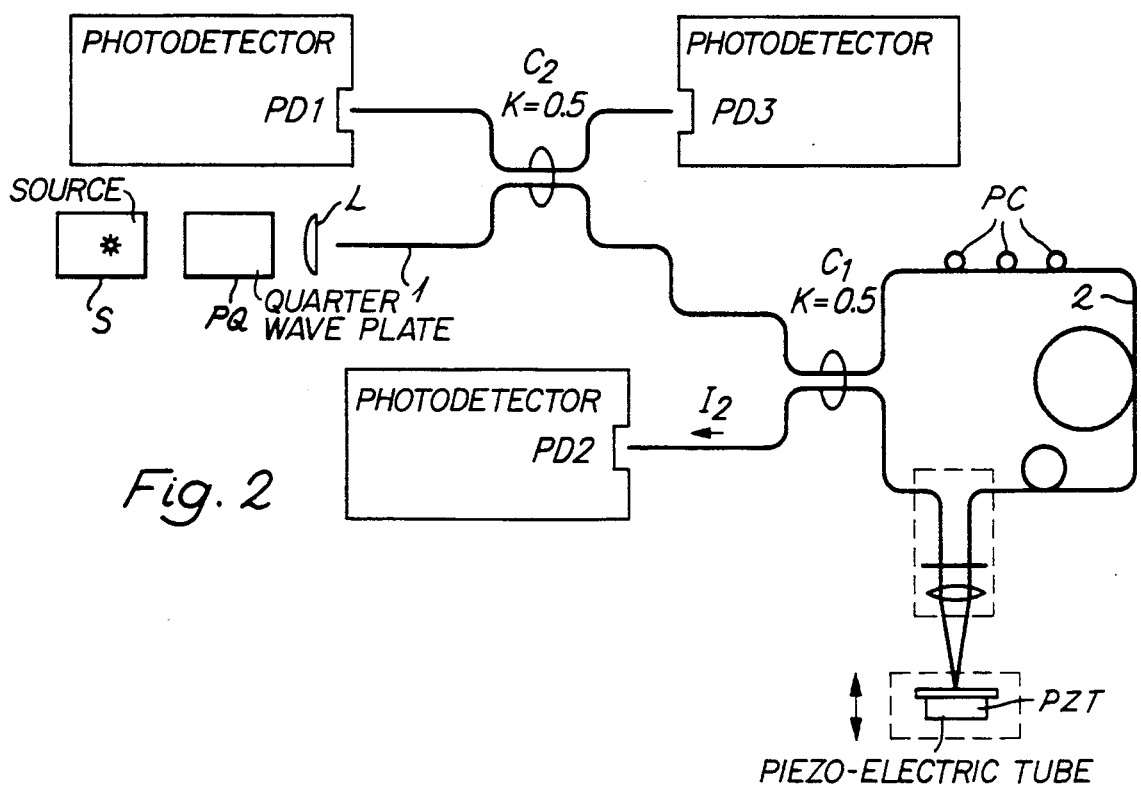
FIG. 2 shows an experimental layout.

Referring now to FIG. 2 of the drawings, this shows a new approach based on the fibre Sagnac interferometer. Classical interferometers have been used to measure optical frequencies, and hence Doppler shifts, directly. For example, both Michelson and Fabry-Perot interferometers have been employed in this way as frequency discriminators for the measurement of Doppler shifts. However, such a technique is appropriate only for the measurement of very high velocities. Otherwise, very long optical paths are required to give the necessary frequency resolution, or impractically high finesse is demanded from a Fabry-Perot. In principle it is possible to make very long path imbalance fibre interferometers. However, such an instrument requires use of a laser source with a very long coherence length, and the measured Doppler shift is indistinguishable from laser frequency noise.

Figure 1:
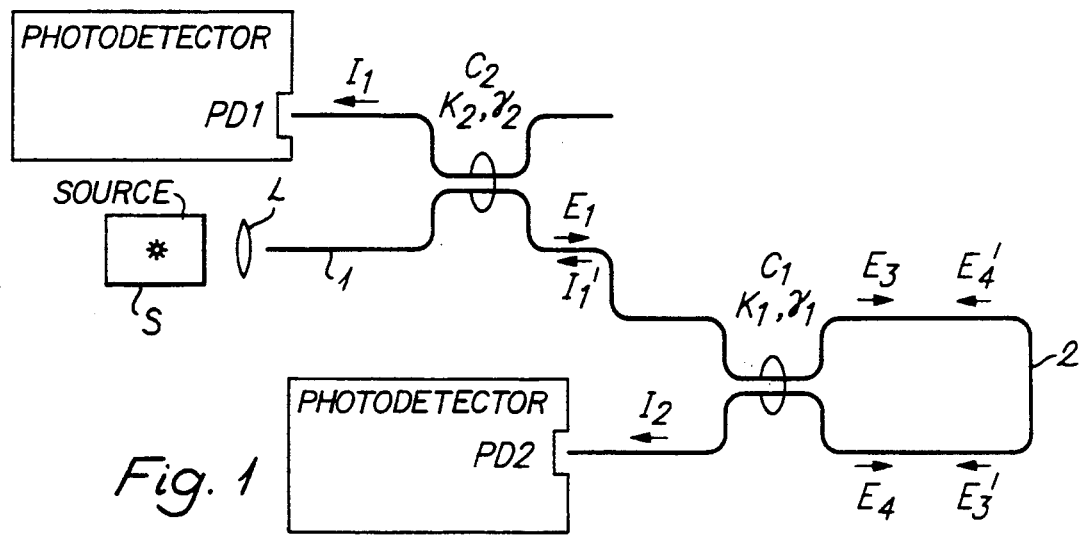
FIG. 1 shows a fibre optic Sagnac interferometer used in one embodiment of the invention.

A schematic of a fibre optic Sagnac interferometer is shown in FIG. 1. Light is guided from a source S and launch lens L by a monomode fibre 1 and is amplitude divided at a directional coupler C1. Divided light then follows clockwise and anticlockwise paths around a loop 2, recombining at the coupler C1. The intensities $I_1$, $I_2$ returned by the coupler arms are measured using photodetectors PD1, PD2. For an interferometer with an ideal, lossless coupler C1, any phase difference $\phi$ between recombining beams modulates the output intensities by the two beam interferometer transfer function.

$$I_{1'2} = I_{01'02}(1 \pm V_{1'2} \cos \phi) \qquad (2,1)$$

where $I_{01'02}$ are constant intensities and $V_{1'2}$ are the fringe visibilities. In a static, non-birefringent loop the optical path lengths for the counter-propagating waves are identical, hence $\phi = 0$. Thus the loop acts as a reflector with reflectance dependent on visibility V, itself in turn dependent on the directional coupler's coupling ratio K.

In practice, phase shifts between counter-propagating beams can be caused by birefringence (including gyrotropic effects), rotation of the loop (fibre gyroscope) and non-uniform, dynamic path length changes in the loop. $\phi$ can thus be written, $$\phi = \phi_B + \phi_D \qquad (2.2)$$

where $\phi_B$ is due to birefringence and $\phi_D$ to dynamic effects. Recovery of phase $\phi$ from output intensity has previously been obtained by a variety of schemes, including phase modulation within the loop with subsequent signal processing polarization analysis of the output and the use of 3×3 directional couplers.

We have taken the novel approach of using a polarization controller in the loop to maintain phase quadrature, that is $$\phi_B = (2N-1)\pi/2 \tag{2.3}$$

N is an integer so (2.1) becomes $$I_{1'2} = I_{01'02}(1 \pm V_{1'2} \sin \phi_D) \tag{2.4}$$

These complementary outputs may be subtracted, using appropriate weighting, to yield:

$$\frac{I_1}{I_{01}} - \frac{I_1}{I_{02}} = (V_1 + V_2)\sin\phi_D \tag{2.5}$$

Phase modulation is achieved by interrupting the fibre loop near the directional coupler with a probe which reflects the beams from a moving target.

Consider two wavefronts recombining at the directional coupler at time t. These will have encountered the target at different times $t-\tau_1$, $t-\tau_2$, due to the asymmetrical positioning of the probe within the loop, resulting in a phase difference of $$\phi_D = \Phi_2 - \Phi_1 = 2k[x(t-\tau_1) - x(t-\tau_2)] \tag{2.6}$$

where x is the normal surface displacement, $k = 2\pi/\lambda$ where $\lambda$ is source wavelength, $\Phi_1$, $\Phi_2$ are the absolute phases of counter-propagating waves. $\phi_D$ can be written $$\phi_D = 2k \int_{t-\tau_2}^{t-\tau_1} v(t)dt \tag{2.7}$$

$$= 2k \bar{v} \Delta\tau \tag{2.8}$$

where $$\Delta\tau = \tau_2 - \tau_1 \tag{2.8}$$

$$v(t) = \frac{dx}{dt}(t)$$

and
$\bar{v}$ = average target velocity between $t-\tau_2$ and $t-\tau_1$

The phase shift is thus due to a time average of the target velocity; the averaging time $\Delta\tau$ is determined by the length of the fibre loop:

$$\Delta\tau = L/c \tag{2.9}$$

where
$L = L_2 - L_1$ (where $L_1$, $L_2$ are fibre lengths from C1 to probe)
n = effective index of fibre
c = speed of light in vacuo The frequency response of phase due to velocity is now obtained by considering a surface vibrating with frequency $f_s = \omega_s/2$, so that $$x = x_o \sin\omega_s t \tag{2.10}$$

hence the normal velocity is $$v = v_o \sin\omega_s t \tag{2.11}$$

where
$v_o = x_o \omega_s$. Then $$\phi_D = 2kx_o[\sin \omega_s(t-\tau_1) - \sin \omega_s(t-\tau_2)] \tag{2.12}$$

$$= 4kx_o \sin\left[\omega_s \frac{\tau_2 - \tau_1}{2}\right] \cos\left[\omega_s \frac{\tau_2 + \tau_1}{2}\right] \tag{2.13}$$

$$= 4kx_o \sin\left[\omega_s \frac{\Delta\tau}{2}\right] \cos\omega_s(t-\tau_0)$$

where
$\tau_0 = (\tau_1 + \tau_2)/2$ and $\Delta\tau = \tau_2 - \tau_1$

Now $$x_o \sin\left[\omega_s \frac{\Delta\tau}{2}\right] = v_o \frac{\Delta\tau}{2} \text{sinc}\left[\omega_s \frac{\Delta\tau}{2}\right]$$

i.e.

$$\phi_D = 2kv_o\Delta\tau \text{sinc}(\tfrac{1}{2}\omega_s\Delta\tau) \cos \omega_s(t-\tau_0) \tag{2.14}$$

A roll-off in response occurs at about $f_s = \tfrac{1}{2}\Delta\tau$ and nulls at $f_s = 1/\Delta\tau$, thus determining a maximum loop delay $\Delta\tau$ for a required system bandwidth. The output intensity of a Sagnac interferometer may be modulated by loop birefringence due to the introduction of phase bias and polarization offset between counter-propagating beams. Further it may be shown that with the ability to produce an arbitrary birefringence in the loop, any arbitrary incident polarization state can have any arbitrary phase difference imposed upon the counter-propagating waves: this is seen by referring to FIG. 1. Monochromatic light of Jones vector E enters loop via directional coupler C1 and is amplitude divided into fields E1, and is amplitude divided into fields E3 and E4 propagating around the loop in opposite directions, and recombining as E3', E4'.

Let the birefringence of the loop in the clockwise direction be given by Jones Matrix $J_A$. Then, due to the co-ordinate change on return, $$E_3' J_A J_B E_3 \tag{2.15}$$

where $$J_B = \begin{bmatrix} -j & 0 \\ 0 & j \end{bmatrix}$$

representing co-ordinate reversal by the loop.

Assuming the loop is lossless, then $E_4'$ is given by $$E_4' = J_B J_A^T E_4 = J_B^T J_A^T E = J_A'^T E_4 \tag{2.16}$$

as $J_B$ is symmetric, and where $J_A' = J_A J_B$

The loop actually has attenuation $e^{-\alpha L}$ which is considered identical for all polarization states, giving the modified forms $$E_3' = e^{-\alpha L} J_A^{40} E_3$$

$$E_4' = e^{-\alpha L} J_A'^T E_4 \quad (2.17)$$

where $$E_3 = (1-\gamma)^{\frac{1}{2}}\sqrt{(1-K)}E_1$$

$$E_4 = (1-\gamma)^{\frac{1}{2}} K E_1 \quad (2.18)$$

where K is the coupling ratio, $\gamma$ is the excess loss, and the coupler is assumed non-birefringent. Therefore, $$(i\ E_4 \dagger E_3) = e^{-j\pi/2}(1-\gamma)(1-K)^{\frac{1}{2}}K^{\frac{1}{2}}E_1 \dagger E_1 \quad (2.19)$$

(where † represents Hermitian conjugate). For a general phase offset of $\phi$ and identical return polarization state, we need $$(E_4' \dagger E_3) = e^{j(\Phi - \pi/2)}(1-\gamma)(1-K)^{\frac{1}{2}}K^{\frac{1}{2}}E \dagger_1 E_1 \quad (2.20)$$

so that $E_1 \dagger (J_A'^T) \dagger J_A' E_1 = e^{j\Phi} E_1 E_1 \quad (2.21)$ thus $E_1 \dagger M E_1 = e^{j\Phi} E_1 \dagger E_1 \quad (2.22)$ $$\rightarrow M E_1 = e^{j\Phi} E_1 \quad (2.23)$$

where $M = (J_A'^T) \dagger J_A' = J_A'^* J_A' \quad (2.4)$

This is solved for given $\Phi$, $E_1$ by finding M satisfying (2.23) and then $J_{A'}$ satisfying (2.24).

In the Poincaré sphere representation any birefringence can be represented as a rotation of angle $\Gamma$ about a given axis. The axis is that corresponding to the two polarization eigenstates of the birefringence, and the angle $\Gamma$ is given by the difference in retardation between fast and slow eigenstates, i.e. $\Gamma = 2\Phi$. Thus any $\Phi$, $E_1$ uniquely define M. Writing M in terms of its unit eigenvectors $$E_{1a} = \frac{1}{1+|\alpha|^2}\begin{bmatrix}1\\\alpha\end{bmatrix};\ E_{1b} = \frac{1}{1+|\alpha|^2}\begin{bmatrix}-\alpha^*\\1\end{bmatrix}$$

and their eigenvalues $\exp(\pm j\Phi)$ $$M = (\hat{E}_{1a}\hat{E}_{1b})\ \text{diag}\ (e^{j\Phi}, e^{-j\Phi})(\hat{E}_{1a}\hat{E}_{1b})\dagger \quad (2.25)$$

Substituting for $\hat{E}_{1a}\ \hat{E}_{1b}$ $$M = \begin{bmatrix} A & B \\ -B^* & A^* \end{bmatrix} = \quad 2.26$$

$$\frac{1}{1+|\alpha|^2}\begin{bmatrix} e^{j\Phi} + |\alpha|^2 e^{-j\Phi} & 2j\alpha^*\sin\Phi \\ 2j\alpha\sin\Phi & e^{-j\Phi} + |\alpha|^2 e^{-j\Phi} \end{bmatrix}$$

which can be used to solve (2.24) for $J_A'$:

$$J_A' = \frac{1}{\sqrt{[2(1-\cos\Phi)]}}\begin{bmatrix} B^* & 1-A^* \\ -1+A & B \end{bmatrix} \quad 2.27$$

then $$J_A = J_A' J_B^{-1} = J_A' J_B \dagger = \quad 2.28$$

$$\frac{j}{\sqrt{[2(1-\cos\Phi)]}}\begin{bmatrix} B^* & -1+A^* \\ -1+A & -B \end{bmatrix}$$

as required.

It should be noted that the condition $E_1 \dagger M E_1 = 0$ is also easily satisfied so that the undesirable condition of 50% reflection without interference can be generated. A phase modulator must therefore be used in order to monitor phase difference and fringe visibility whilst setting up the interferometer.

The fringe visibilities $V_{1'2}$ are products of three parameters of the light waves returning to the coupler
1. Their relative intensities $$V_{int} = 2|E_3'||E_4'|/(|E_3'|^2 + |E_4'|^2)$$

2. The scalar product of their polarization states, $$V_{pol} = |\hat{E}_3' \dagger \hat{E}_4'|$$

3. Their mutual coherence $V_{coh} = |\gamma_{34}|$

Thus, assuming fibre losses for counter-propagating beams are identical, the only other effect is due to the coupler:

$V_1$ has $V_{int} \approx 1$ $V_2$ has $V_{int} \approx 1([2K(1-K)]^{-1} - 1)^{-1}$ A polarization controller consisting of two quarter- and one half-wave plate is capable of synthesizing any general birefringence. If the actual loop birefringence is given by $J_L$, then the controller must synthesize $J_p = J_L^{-1} J_A$. Then, aside from fluctuations in birefringence, we obtain $V_{pol} \approx 1$.

Mutual coherence depends on source coherence and path length imbalance. As path length imbalance is simply the delay due to birefringence, potentially sub-wavelength, its effect on V would generally be negligible for all but highly broadband sources.

This sensor thus has the advantage of an inherently high fringe visibility.

The phase resolution of the Sagnac depends on the following noise sources:

Detector Photocurrent Noise or Shot Noise
sets a fundamental system limit. Assuming visibility is close to 1, when the system is close to quadrature, the intensity incident on PD1 is $$I_1 = I_{01}(1+\sin\phi_D),\ \phi_D\ \text{small} \quad (2.29)$$

This produces a detector photocurrent $$i_{01} = \frac{I_{01}q}{h\nu}\eta \quad 2.30$$

where
  q = electronic charge
  $\nu$ = frequency of source light
  h = Plancks constant
  $\eta$ = quantum efficiency of detector (0.69 for a silicon photodetector used at a wavelength of 633 nm)
which, measured over a bandwidth B, has a shot noise of $$i_{1shot} = \sqrt{(2qBi_{01})} \quad (2.31)$$

with a resultant phase error of $$\phi_{1shot} = i_{1shot}\frac{d\phi}{di} = \frac{i_{1shot}}{i_{01}} = \sqrt{\left[\frac{1h\nu B}{I_{01}\eta}\right]} \quad 2.32$$

If the system has two antiphase outputs which are subtracted so as to reduce intensity variations, then $$\phi\text{shot} = \tfrac{1}{2}\sqrt{[\phi^2_{1ishot} + \phi^2_{2ishot}]} \quad\quad 2.33$$

$$= \tfrac{1}{2}\sqrt{\left[\frac{2h\nu B}{\eta}\left[\frac{1}{I_{01} + \frac{1}{I_{02}}}\right]\right]}$$

e.g. $2\times10^{-8}$ rad $HZ^{-\frac{1}{2}}$ at 633 nm with recovered power of 1 mW per detector.

Laser Phase/Frequency Noise
will be converted into intensity noise by any optical path length imbalance in the interferometer, by $$\Delta\phi = \Delta\omega/c$$

However, in this interferometer the path imbalance arises from birefringence effects, due mainly to bend induced birefringence in the fibre coil, and is thus only a few wavelengths.

For path length imbalance $\sim N\lambda$, N an integer, $$\Delta\phi = 2\pi\Delta f \frac{N\lambda}{c} = 2\pi N \frac{\Delta f}{f}$$

so even for, say $N=5$, to achieve $\Delta\phi = 10^{-5}$ rad over 1 MHz we need $$\frac{\Delta f}{f} = 0.3 \times 10^{-6}$$

e.g. for 830 nm, $f = 361$ THz, so need $\Delta f = 100$ MHz.

This is well beyond the frequency noise characteristics of, for example, diode lasers. The Sagnac is thus insensitive to slowly-varying changes in laser frequency, compared with the loop propagation time, with a residual frequency noise floor arising from dynamic effects.

Coherent Rayleigh Noise (CRN)
due to delayed self-homodyne type mixing of the primary light and Rayleigh backscattering. If primary and backscattered light occupied the same polarization state, this would lead to a phase error of $$\phi CRN = \left[\frac{I_{ray}}{I_{circ}} \frac{B}{8\pi\Delta f}\right] \quad\quad 2.34$$

where
$I_{ray}$ = Rayleigh backscattered intensity
$I_{circ}$ = Circulating intensity
B = Bandwidth
f = Linewidth of source Consider a loop of monomode fibre operated at 633 nm with an attenuation of 10 dB $Km^{-1}$, most of which is Rayleigh scattered.

Backscattered power into fibre will be of the order of $$\frac{\pi(N.A.)^2}{n^2 \cdot 4\pi} = 10^{-3} \quad \begin{array}{l}\text{of total scattered power}\\\text{(assuming isotropic scattering)}\end{array}$$

where
N.A. = fibre numerical aperture
n = fibre refractive index

So for a 200 m coil with a source having $$\Delta f = 60 \text{ MHz } (L_c = 5 \text{ m}), \phi CRN = 5\times10^{-7} \text{ rad } HZ^{-\frac{1}{2}}$$

Three main approaches are available which will reduce the level of CRN:
1. Longer wavelength source to reduce Rayleigh scattering (scales $1/\lambda^4$)
2. Broadband source: SLED, superfluorescent fibre or using a laser diode, stimulate a low coherence by fast frequency modulation
3. Ensure that the polarization state of the backscattered beam is orthogonal to co-propagating primary beam over as great a fibre length as possible.

Other noise is due to reflection from any fibre splice or discontinuity at the probe will result in the same type of delayed self-homodyne noise as CRN. Any reflections within a few coherence lengths of each other will also yield output signals varying due to source frequency noise and optical path length fluctuations within the fibre. Further, in a region within a coherence length of half way round the loop backscatter will be coherent with the primary light and will result in noise at the output with a spectrum corresponding to fluctuation of optical path length within the loop. These effects are minimized by avoiding reflections in the system, and following the same precautions as for coherent Rayleigh noise.

Laser amplitude noise will directly modulate any out of quadrature signal when antiphase outputs are subtracted. It would in principle be removed by analogue or digital division of the photodetector output by an intensity reference. Such devices do not usually have sufficient dynamic range and bandwidth however, so the preferred solution is to use a quiet source.

Three basic probe types have been considered for use in this interferometer: (FIG. 3) (a),(b). This shows the ideal case. Beams from both fibres F1,F2 are focussed on to overlapping beam waists. If the target is a smooth surface, efficient coupling between fibres is achieved for minimal back reflection. Disadvantages are complexity and difficulties in alignment.

Figure 3A:
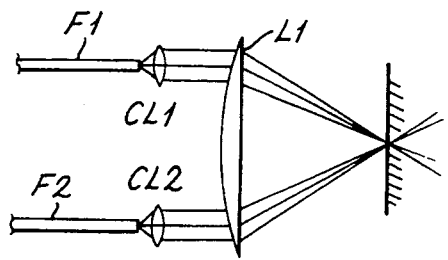
FIGS. 3(a) through 3(d) illustrate various probe configurations.
Figure 3B:
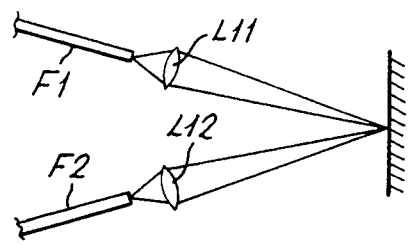
Figure 3C:
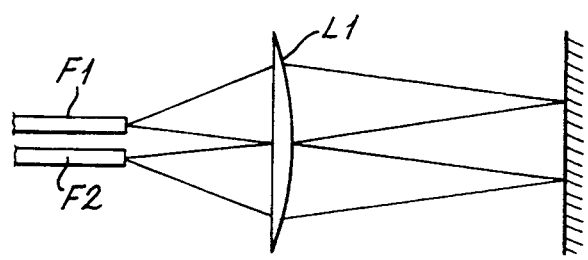

In a further embodiment FIG. 3(c), the probe beam 1s collimated, so a flat surface must be used. The system is nominally misaligned for d > focal length f but reasonable cross-coupling efficiencies can be achieved for minimal backscatter.

Figure 3D:
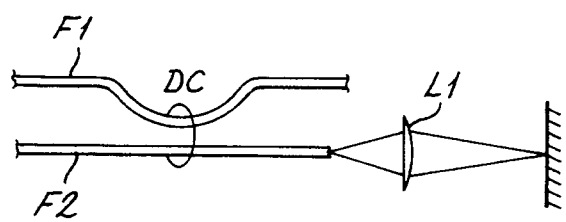

A still further embodiment, FIG. 3(d), is the simplest of all three probe types with only the most basic alignment required. The directional coupler DC does waste power, however, and backscattering from target is as large as the cross-coupling. The source coherence time must therefore be much less than the loop propagation time.

We now compare the performance of above embodiments with that of the other velocity interferometers.

Consider the case where light from a source of angular frequency $\omega_o$ is reflected normally off a target moving with velocity v and then analyzed by an unbalanced Michelson interferometer, with arms of optical path length $L_1$, $L_2$.

After target, $\omega_o$ is doppler shifted to $\omega_\Gamma = \omega_o(1 + 2v/c)$. The phase difference between recombining beams is given by $$\phi = 2\frac{\omega_r}{c}(L_2 - L_1) = 2\frac{\omega_r}{c}\Delta L = \frac{2}{c}\left(1 + 2\frac{V}{c}\right)\omega_o \Delta \quad 2.35$$

so, presuming an adequate phase recovery scheme exists, the following phase dependences will be observed:

$$\frac{\partial \phi}{\partial V} = 4V\frac{\omega_o}{c}\frac{\Delta L}{c} \approx 8V\pi\frac{\Delta \pi}{\lambda} \quad 2.36$$

$$\frac{\partial \phi}{\partial \omega_s} = \frac{2}{c}\left[1 + 2\frac{V}{c}\right]\Delta L \approx \frac{2\omega_o \Delta L}{c} \text{ for } V << c$$

$$\frac{\partial \phi}{\partial \Delta_L} = \frac{2}{c}\left[1 + 2\frac{V}{c}\right]\omega_o \approx \frac{2\omega_o}{c} \text{ for } V << c$$

This system has three clear disadvantages compared to the Sagnac, in the measurement of low velocities:

1. It requires a source coherence length $> \Delta L$, limiting the potential velocity sensitivity.
2. It cannot distinguish between frequency noise in the source and doppler shift due to surface vibration, unless a second reference cavity is used.
3. It is extremely sensitive to changes in path length imbalance. A change in $\Delta L$ of $\lambda/4$ results in a phase shift of $\pi/2$, leading to the stringent condition $$\alpha(\Delta L)/\Delta L << \lambda/4\Delta L$$

e.g. for $\lambda = 633$ nm, $\Delta L = 150$ m, $\lambda/4\Delta L \approx 10^{-9}$ Path length stability is a particular problem in fibre optic interferometers, because of the strong temperature dependence of the fibre refractive index.

The Fabry-Perot interferometer has also been used with success to recover velocity information from frequency shifts and is an obvious extension of the Michelson with the same drawbacks of source coherence, sensitivity to frequency noise and stringent stability requirements.

The Sagnac interferometer offers potential as a simple, passive laser doppler analysis (LDA) system which gives the sign as well as the magnitude of the appropriate velocity component of a seed particle. Consider such a system using probe type c:

A particle of velocity v along axis of probe, traversing the beam waist, will produce pulses at the complementary outputs of $I_1(t)$, $I_2(t)$ where $I_1 + I_2$ gives the intensity of backscattered light and $(I_1 - I_2)(I_1 + I_2)$ gives the velocity, with appropriate sign, of the particle along the beam axis.

If interference is to take place, it is essential that the time that the particle spends in the beam, up, $\tau_p$, longer than the loop delay $\Delta \tau$. In order to see when this condition is fulfilled, consider a flow with seed particles of maximum velocity $v_{max}$. The loop delay can then be set to give a maximum dynamic phase shift of $\sim \pi/4$, ensuring linearity, a good signal to noise ratio and avoiding velocity ambiguity.

$$ie\ \Delta \tau = \frac{\phi}{2kv_{max}} = \frac{\pi}{8.2\frac{\pi}{\lambda}v_{max}} = \frac{\lambda}{16v_{max}} \quad 2.37$$

The dimensions of the linear region $L_i$ must thus be such that $$\tau_p = \frac{L_i}{v_{max}} >> \Delta \tau = \frac{\lambda}{16v_{max}} \quad 2.38$$

$$ie\ L_i >> \frac{\lambda}{16} \quad 2.39$$

a condition which is automatically fulfilled for practical optical systems.

The experimental arrangement is shown in FIG. 2. It is similar to that described in the previous section with a loop 2 of length (L) of approximately 210 m. A number of precautions were taken to reduce potential noise sources. The source laser S was isolated from the interferometer using a polarizer and quarter-wave plate PQ to prevent returns from the interferometer reflecting back off the laser output coupling mirror. Interference arising from Fabry-Perot cavities caused by Fresnel reflection at fibre-air interfaces was minimized using index-matching gel and microscope coverslips. Fibre connections were made by fusion splicing to reduce other unwanted reflections. The interferometer was acoustically, vibrationally and thermally shielded by embedding it in foam. The purpose of the second directional coupler C2 was to enable both measurement of the reflected Sagnac output and monitoring of the power entering the loop. A response proportional to target velocity, and hence proportional to frequency for harmonically oscillating targets of fixed vibration amplitude was demonstrated in 'Closed-loop' tests where the experimental arrangement was that of FIG. 2 without the probe section. A vibrating surface was simulated by periodically stretching the fibre using a piezo-electric tube (PZT), wound with approximately 50 turns of fibre. The PZT frequency response was measured in an ancillary experiment, using a Michelson fibre interferometer. The frequency response was found to be approximately flat and linear from dc up to about 10 kHz, above which frequency mechanical resonances were observed accompanied by strong nonlinearities.

Interferometer tests were carried out over the linear frequency response range of the PZT. The two optical outputs, at PD1 and PD2, were found to vary in antiphase, in accordance with theory. This observation precludes the possibility that the observed output was due to intensity modulation, caused for example by bend losses in the fibre, rather than the predicted phase modulation. (Intensity modulation would cause the outputs to vary in phase). The complementarity of the outputs was checked by addition, with independent gains to compensate for the signal reduction of one output due to it traversing the additional coupler. The addition did indeed produce a line of reasonably constant intensity, with a slight modulation due to the non-ideal nature of the coupler C1.

Figure 4:
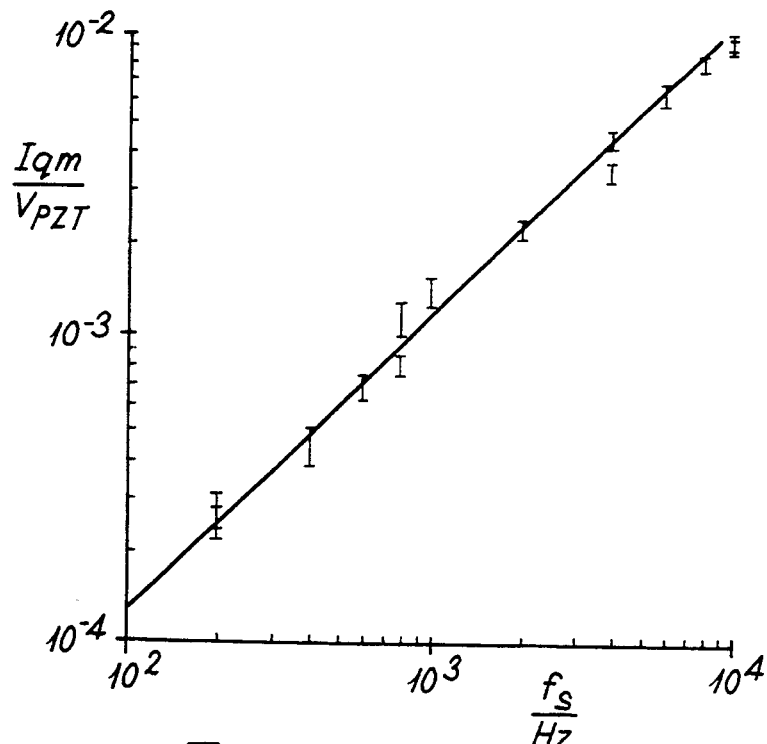
FIG. 4 is a graphical representation of measurements of signal amplitude.

The sensitivity of the interferometer was found to be dependent on the adjustment of the polarization controller, in accordance with the theoretical prediction, such that it was possible to operate at any point on the transfer function and also vary the visibility of the fringes. The tests were carried out with the interferometer adjusted to its quadrature point, where it exhibits maximum sensitivity. Because the detected optical phase in the Sagnac is a function of target velocity, we expect the output photocurrents to be amplitude modulated to a depth proportional to the PZT modulation frequency at constant PZT output voltage. This is illustrated by the results shown in FIG. 4 (normalized with respect to the PZT driver's output voltage). The superimposed straight line corresponds to a device sensitivity of 21.2 rad/ms$^{-1}$.

We developed two alternative techniques to determine the absolute change in optical path distance.

The first of these we term the 'Fringe Amplitude' method. By examination of equation (2.1) we see that the detected intensity at either of the Sagnac outputs at quadrature (i.e. $\phi_B = \pi/2$) for a harmonically vibrating surface (i.e. $\rho_D = \rho_S \sin \omega_s t$) is given by, $$I_q = I_{qo}[1 \pm V_q \sin (\phi \sin \omega_s t)] \qquad (3.1)$$

now, assuming $\phi D$ small, the modulation amplitude of the detected signal; is given by, $$I_{qm} = I_{qo} V_q \phi_s \qquad (3.2)$$

Due to the high visibility of the Sagnac output fringes, i.e. $V_q \approx 1$, the induced phase shift (In radians) is this given by $$\phi_S = \frac{I_{qm}}{I_{qo}} \qquad 3.3$$

that is, by the ratio of the actual modulated signal amplitude to the fringe amplitude.

The second empirical way of determining the phase shift induced by the PZT is by the "Harmonics" method, whereby we compare the system outputs when the polarization controller is adjusted to set the operating point either at quadrature or at a turning point of the transfer function.

If the system is operated at a turning point then the extrinsic phase $\phi_B = 0$ and, on making the small $\delta_D$ approximation, the detected signal, $$I_t = I_{to}\left[1 \pm V_t\left[1 - \frac{\phi_S^2 \sin^2 \omega_s t}{2}\right]\right] \qquad 3.4$$

which is a signal modulated at twice the frequency (and hence termed the Second Harmonic) of the output at quadrature (i.e. the first harmonic). Therefore, the modulation amplitude, $$I_{tm} = \frac{I_{to} V_t \phi^2}{4} \qquad 3.5$$

Thus, by comparison with (3.2) and assuming $V_t = V_q$, it follows that the induced phase shift, $$\phi_S = 4\frac{I_{tm}}{I_{qm}} \cdot \frac{I_{qo}}{I_{to}} \qquad 3.6$$

The phase shift $\phi_s$ can be predicted using the expected values of $d\Phi/dV$ for the phase shifter and loop delay $\Delta\tau$.

This type of PZT typically gives $52\pm5$ mradV$^{-1}$turn$^{-1}$ at low frequencies. The 52 turns used here give a predicted $d\Phi/dV = (2.70\pm0.26)$radV$^{-1}$. Total loop length here was estimated at $(210\pm10)$m, resulting in $\Delta\Gamma = (1.02\pm0.05 \mu s)$ yielding, for harmonic excitation, $$\frac{\partial^2 \phi_S}{\partial v \partial f_S} = 2\pi\alpha\Gamma \frac{d\Phi}{dV} = (17.3 \pm 2.1)\mu\text{rad}V^{-1}\text{Hz}^{-1} \qquad 3.7$$

A sample comparison of phase shift values induced in the closed-loop tests calculated by both the fringe amplitude and harmonics techniques shown in Table 1 illustrates that both methods agree with the prediction within experimental error. In practice the former was found more convenient to implement.

It is possible to calculate the peak velocity ($v_o$) of the surface over the propagation time of the loop ($\Delta\tau$) from the induced phase shift. That is, from equation (2.14), the peak induced phase shift amplitude, $$\phi_S = 2kv_o\Delta\tau \text{sinc}\left[\frac{\omega_o \Delta\tau}{2}\right] \qquad 3.8$$

from which $v_o$ may be determined if $\Delta\tau$ is known.

Velocities calculated in this manner for the closed-loop tests are given in Table 2.

Figure 5:
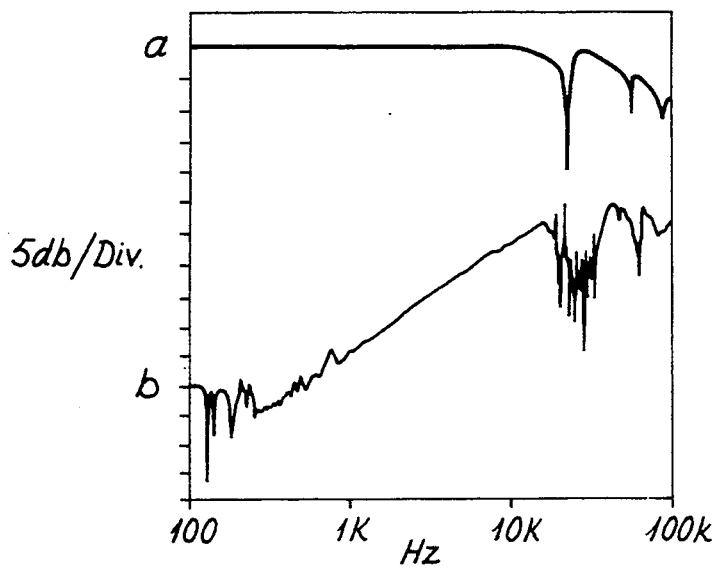
FIG. 5 is a display of a network analyzer trace.

Verification of the Sagnac's linear frequency response was confirmed using a Network Analyser to sweep the PZT driver's frequency from 100 Hz to 100 kHz. The driver was shown to have constant output voltage up to 10 kHz and the interferometer a corresponding linear response—shown in FIG. 5.

To show the device operating in a practical situation on a real moving surface a probe section (design c in FIG. 3) was spliced into the loop as per FIG. 2. The probe fibres were 3 m long and the probe beams set afocal using a ×10 microscope objective lens. A reflective element mounted on a small piezo-electric shaker (PZS) driven directly from a function generator was used as a target. The fibre to target distance was arbitrarly chosen to be 16 cm and the measurement volume spot radius was approximately 1.6 mm.

The probe was aligned to couple the counter-propagating beams back off the target into the opposite fibres and open-loop static-mirror tests performed at quadrature using the PZT in the loop to provide the phase modulation showed that the system gave the same response proportional to frequency as in the closed-loop tests but with an approximate 50% decrease in overall signal intensities due to the extra loss introduced by incomplete re-coupling back into the probe.

Vibrating mirror tests were performed at sample resonant PZS frequencies and the induced phase shifts calculated using the Fringe Amplitude method. The detected phase shifts ranged from 0.02 to 0.30 radians corresponding to peak target velocities of 1.1 mms$^{-1}$ to 15.6 mms$^{-1}$.

Figure 6:
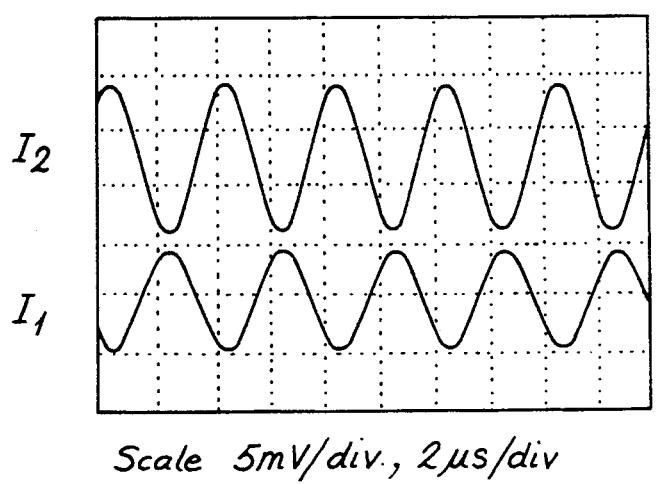
FIG. 6 is an oscilloscope trace.

A typical set of antiphase outputs with vibration frequency 244 kHz is shown in FIG. 6. One output shows a modulation amplitude of $(6.75\pm0.25)$ mV with a fringe amplitude of $(37.5\pm2.5)$ mV and the other $(4.25\pm0.25)$ mV of modulation with a full fringe of $(25\pm5)$ mV. These correspond to self-consistent phase shifts of $(0.18\pm0.01)$ rad and $(0.17\pm0.02)$ rads respectively, and hence to velocities of $(9.5\pm0.7)$ mms$^{-1}$ and $(8.9+1.1)$ mms$^{-1}$ respectively.

The noise floor of the system was measured, in the absence of an external signal, and was found to be equivalent to a target velocity of around 50 nms$^{-1}$ Hz$^{-\frac{1}{2}}$ r.m.s. in the frequency range above 100 kHz.

The Sagnac was found to give a null response at 935 kHz thus giving $\Delta\tau = 1.07$ μs corresponding to a loop length L = 220 m.

We measured modulated signals from surfaces vibrating at frequencies in the range 90 kHz to 1 MHz limited only by the PZT response falling off beyond these frequencies.

The optical fibre Sagnac interferometer may be adapted to form a passive velocimeter whose output is directly dependent on target velocity. Much lower velocities can be measured using this technique than is achievable using, for example, a Fabry-Perot interferometer, and the technique is much less sensitive to the effects of source frequency noise. He have demonstrated the operation of a practical fibre optic Sagnac velocimeter with a linear response for non-contacting velocity measurement of vibrating surfaces. Its linearity was verified in tests with a simulated vibration signal up to 10 kHz and we have shown it is possible to retrieve the signal from a real vibrating surface via a probe at frequencies at least up to 1 MHz. Quadrature operation was maintained by a novel method involving the controlled introduction of fibre birefringence. We have presented alternative designs which allow the technique to be applied in the measurement of fluid velocities.

TABLE 1

| FREQ./kHz | FRINGE AMPLITUDE METHOD | INDUCED PHASE SHIFT/rad HARMONICS METHOD | PREDICTED |
|---|---|---|---|
| 3 | 0.59 ± 0.07 | 0.57 ± 0.10 | 0.46 ± 0.06 |
| 4 | 0.69 ± 0.09 | 0.74 ± 0.14 | 0.61 ± 0.07 |
| 5 | 0.83 ± 0.11 | 1.03 ± 0.18 | 0.76 ± 0.09 |

TABLE 2

| FREQ./kHz | PEAK SURFACE VELOCITY/cms$^{-1}$ | | |
|---|---|---|---|
| | FRINGE AMPLITUDE METHOD | HARMONICS METHOD | PREDICTED |
| 3 | 2.9 ± 0.3 | 2.8 ± 0.5 | 2.3 ± 0.3 |
| 4 | 3.4 ± 0.5 | 3.7 ± 0.7 | 3.0 ± 0.3 |
| 5 | 4.1 ± 0.5 | 5.1 ± 0.9 | 3.8 ± 0.4 |

We claim:

1. Apparatus for measuring velocity comprising:
   an interferometer including a loop of fibre optic radiation guide;
   means for launching optical signals from a source of radiation in opposite directions around said loop;
   probe means located within said loop and adapted to launch said optical signals from said radiation guide towards a moveable target, and to receive said optical signals after reflection from said target, and to re-direct said received optical signals into said radiation guide.

2. Apparatus as claimed in claim 1 further comprising phase control means to create a phase difference between said optical signals, wherein said phase control means comprises means to control birefringence in said loop of fibre optic radiation guide.

3. Apparatus as claimed in claim 2 wherein said phase control means comprises means to control birefringence in said loop of fibre optic radiation guide.

4. Apparatus as claimed in claim 1 wherein said phase control means is adapted to introduce a phase bias of substantially $\pi/2$ between said optical signals.

5. Apparatus as claimed in claim 1 including polarization control means to substantially maintain phase quadrature in said loop.

6. Apparatus as claimed in any one of claims 1, 2, 3, 4 or 5 wherein the source of radiation is isolated from the interferometer by means of a polarizer and a quarter-wave plate.

7. Apparatus as claimed in claim 1 wherein means is provided to focus beams from two fibre ends on to overlapping beam waists.

8. Apparatus as claimed in claim 1 wherein beams from two fibre ends are collimated.

9. Apparatus as claimed in claim 1 further comprising:
   coupler means for coupling radiation from opposing arms of said probe means; and
   focussing means provided to launch and receive radiation from one only of said opposing arms.

10. Apparatus as claimed in claim 1 further comprising directional coupler means for measuring radiation reflected from said target and for measuring a power of radiation entering said loop.

* * * * *